(No Model.)
P. PETERSON.
JOURNAL FOR MILK SEPARATORS.
No. 359,030. Patented Mar. 8, 1887.
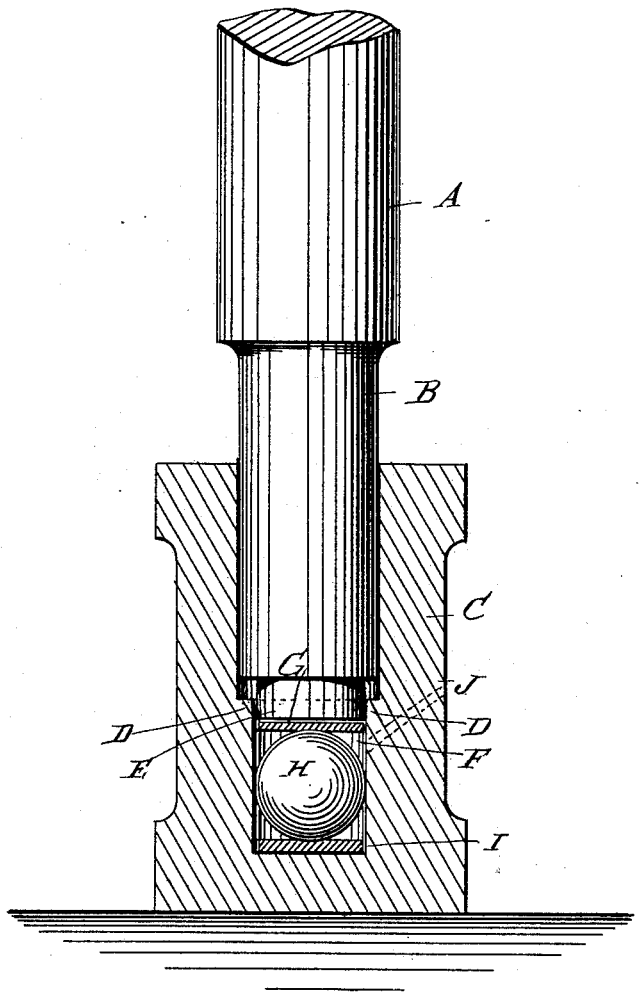
WITNESSES:
Chas. Nida
C. Sedgwick
INVENTOR:
P. Peterson
BY Munn & Co
ATTORNEYS.

UNITED STATES PATENT OFFICE.

PETER PETERSON, OF REINBECK, IOWA.

JOURNAL FOR MILK-SEPARATORS.

SPECIFICATION forming part of Letters Patent No. 359,030, dated March 8, 1887.

Application filed October 22, 1886. Serial No. 216,946. (No model.)

*To all whom it may concern:*

Be it known that I, PETER PETERSON, of Reinbeck, in the county of Grundy and State of Iowa, have invented a new and Improved Journal for Milk-Separators, of which the following is a full, clear, and exact description.

The object of my invention is to provide a new and improved journal specially adapted for the axle of milk-separators.

The invention consists of an axle fitted in a bearing and supported by a steel disk resting on a ball supported by a second disk and fitted in a recess in the said bearing.

The invention also consists of the various parts and details and combinations of the same, as fully described, and pointed out in the claims.

Reference is to be had to the accompanying drawing, forming a part of this specification, in which the figure represents a sectional elevation of my improvement, showing the axle in elevation.

The axle A of the milk-separator is provided with the reduced end B, which fits partly into the stationary bearing C and terminates with its lower end near the annular shoulder D of the bearing C. An annular offset, E, projects from the end B and fits into the recess F of the bearing C. In the bottom of the recess F is placed a steel washer or disk, I, on which rests a ball, H, which fits into the recess F and supports on top a second washer or disk, G, on which rests the offset E. An oil-hole, J, extends from the outside of the bearing C to the recess F.

The axle A revolves at a very high rate of speed, and its rotary motion is imparted to the disk G and the ball H, which supports the axle A.

It will be seen that the ball H has very little frictional contact, and is not liable to get hot, even if rotated at a very high rate of speed, and as the axle is always centrally supported by the ball H, it is also not liable to get hot, and at the same time takes up very freely the oil supplied by the oil-hole J. When the ball is worn out, it can be easily replaced by a new one, and when the surface of the disk I becomes worn it can be turned off and polished, and again replaced and used.

Having thus fully described my invention, what I claim as new, and desire to secure by Letters Patent, is—

1. The combination of the bearing C, having the recess F, of the disks G and I and the ball H, fitted in the said recess, substantially as shown and described.

2. The bearing C, having the recess F and shoulder D, adapted to receive the axle A, having the end B and annular offset E, in combination with the disks and the ball H, both fitted into the said recess F, substantially as herein shown and described.

3. The bearing C, having the recess F and the oil-hole J, adapted to receive the axle A, provided with the end B, having annular offset E, in combination with the disks G I and the ball H, fitted in said recess F, substantially as herein shown and described.

PETER PETERSON.

Witnesses:
T. JOWOLSON,
T. H. SKOURUP.